United States Patent [19]
Oldfield

[11] Patent Number: 5,627,988
[45] Date of Patent: May 6, 1997

[54] DATA MEMORIES AND METHOD FOR STORING MULTIPLE CATEGORIES OF DATA IN LATCHES DEDICATED TO PARTICULAR CATEGORY

[75] Inventor: William H. Oldfield, Cambridgeshire, United Kingdom

[73] Assignee: Advanced Risc Machines Limited, Cambridge, United Kingdom

[21] Appl. No.: 515,543

[22] Filed: Aug. 16, 1995

[30] Foreign Application Priority Data

Sep. 30, 1994 [GB] United Kingdom ............ 9419746

[51] Int. Cl.⁶ .................................................. G06F 13/00
[52] U.S. Cl. ....................... 395/428; 395/431; 395/450; 365/230.03
[58] Field of Search .................................. 395/449, 450, 395/431, 428; 365/189.05, 230.03

[56] References Cited

U.S. PATENT DOCUMENTS

| | | |
|---|---|---|
| 3,938,097 | 2/1976 | Niguette, III ............... 395/455 |
| 5,126,975 | 6/1992 | Handy et al. ............... 365/230.01 |
| 5,185,879 | 2/1993 | Yamada et al. ............ 395/445 |
| 5,201,041 | 4/1993 | Bohner et al. ............. 395/465 |
| 5,285,323 | 2/1994 | Hetherington et al. .... 395/449 |

FOREIGN PATENT DOCUMENTS

| | | |
|---|---|---|
| 2244157 | 11/1991 | United Kingdom . |
| 2255211 | 10/1992 | United Kingdom . |

*Primary Examiner*—David L. Robertson
*Attorney, Agent, or Firm*—Albert C. Smith

[57] ABSTRACT

A data memory having an addressable array of memory cells which can be accessed as predetermined groups of memory cells, comprises output buffer means for storing the contents of at least the most recently read group of memory cells and another previously read group of memory cells; and reading means, responsive to an indication that the contents of the group of memory cells containing the required memory cell is not stored in the output buffer means, for reading the contents of the group of memory cells containing the required memory cell into the output buffer means; the contents of at least the required memory cell being supplied as an output from the output buffer means.

15 Claims, 4 Drawing Sheets

DATA MEMORIES AND METHOD FOR STORING MULTIPLE CATEGORIES OF DATA IN LATCHES DEDICATED TO PARTICULAR CATEGORY

BACKGROUND OF THE INVENTION

1. Field of the Invention

This invention relates to accessing data memories.

2. Description of the Prior Art

It is known to use a cache memory to improve the performance of a central processing unit (CPU) in a data processing system. A cache memory is a relatively small, high speed random access memory (RAM) which is used to store data which are frequently required by the CPU. Typically, the cache RAM is directly accessed by the CPU (rather than via, for example, an external memory management unit (MMU)) and is situated physically close to the CPU in order to reduce the signal propagation time between the CPU and the cache memory. These features mean that data can be stored in or retrieved from the cache RAM very quickly.

Cache RAMs are commonly organised as a number of cache "lines", where each line may store, say, eight data words. When the cache RAM is accessed, a whole line of data is read and placed onto output bit lines. If the next cache RAM access requires a data word from the same cache line, then there is no need to re-read that line; the word can simply be read from the output bit lines.

The operation of reading cache lines onto the output bit lines consumes a considerable proportion of the total power requirement of the cache RAM. This is because the reading operation involves precharging sense amplifiers to read the data, followed by charging of the highly capacitive bit lines themselves.

In one known type of cache RAM architecture, a single cache RAM is used to store both data words and processor instruction words. This can lead to a particularly high power consumption in cases where executing an instruction loaded from one cache line causes the processor to load data from or store data to a different cache line. In this situation, the processor initially loads an instruction from the cache RAM by causing the cache line storing that instruction to be read onto the bit lines. When the instruction is executed, the processor reads or writes to another cache line. This means that the cache line containing the instruction is discarded from the bit lines and the new cache line read onto the bit lines. (In the case of the processor writing to the cache RAM, the bit lines are used in the writing process and so the values currently held on the bit lines still have to be discarded). After the load of store operation has been completed, the new values held on the bit lines again have to be discarded and the original cache line re-read to allow the processor to access subsequent required instructions.

These multiple instruction-data-instruction accesses can increase considerably the power consumption and access time of the cache RAM. The increase in power consumption has been estimated as between 10 to 30% of the total cache power consumption; this can be a major problem with cache RAMs, which already use a relatively high proportion of system power. Also, as mentioned above, an increase in access time is particularly disadvantageous in a cache RAM, where a primary requirement is one of high speed operation.

It is an object of the invention to reduce the power consumption and access time of data memories, and in particular of cache memories. This object is especially relevant to data memories intended for use in portable, battery-powered equipment.

SUMMARY OF THE INVENTION

This invention provides a data memory comprising:

an addressable array of memory cells which can be accessed as predetermined groups of memory cells;

output buffer means for storing the contents of at least the most recently read group of memory cells and another previously read group of memory cells; and reading means, responsive to an indication of whether the contents of the group of memory cells containing the required memory cell are stored in the output buffer means, for reading the contents of the group of memory cells containing the required memory cell into the output buffer means;

the contents of at least the required memory cell being supplied as an output from the output buffer means.

In a data memory according to the invention, a group of memory cells (e.g. a cache line) is read out and stored in an output buffer, along with at least one other previously read group. This can alleviate the problem described above, in which the execution of a processor instruction loaded from one cache line causes the processor to load data from or store data to a different cache line before returning to the original cache line to read subsequent required instructions. This is because the original cache line will not have been discarded (as it would in the previously proposed memories described above), but will instead be held in the output buffer means. As described above, this can improve the power consumption of, say, a cache RAM dramatically, by reducing the number of cache line read operations from, for example, three accesses to two accesses in the case of an instruction-data-instruction series of accesses.

Preferably the output buffer means comprises at least two output latches, each output latch storing the contents of one group of memory cells.

In preferred embodiments, at least one of the output latches is an active latch, such as a transistor or semiconductor latch. However, as an alternative, at least one of the output latches could be a capacitive or dynamic latch. This type of latch may be formed substantially by the capacitance of bit lines connected to the array of memory cells.

When the output buffer means is formed of a number of latches, each storing one group of memory cells, it is useful to overwrite previously latched data in a controlled manner. One way of doing this is used in a preferred embodiment in which the reading means is operable to read the contents of the group of memory cells containing the required memory cell into the output latch which has been least recently written to.

In an alternative embodiment in which the data memory stores at least two categories of data, data from each category could be stored in a respective (dedicated) one of the output latches. Preferably, this arrangement is used for a data memory storing two categories of data, namely:

instruction words; and non-instruction words.

Although the data memory could be controlled from external devices, so that the indication of whether a new group of memory cells should be read into the output buffer means is supplied by an external device, in one preferred embodiment this indication is derived within the data memory itself, by employing means for storing address data indicative of the address of the groups of memory cells stored in the output buffer means; and detecting means, responsive to the address of a required memory cell and the stored address data, for detecting whether the contents of the group of memory cells containing the required memory cell is stored in the output buffer means; the detecting means generating and supplying to the reading means the indication of whether the contents of the group of memory cells containing the required memory cell are stored in the output buffer means.

In a preferred embodiment the detecting means is responsive to an indication from a device accessing the data memory that a current required memory cell has an adjacent address to a preceding required memory cell. This can at least partially indicate that the currently required memory cell's contents may be found in the output buffer means.

Preferably the reading means is responsive to an indication from a device accessing the data memory of whether a current required memory cell has an adjacent address to a preceding required memory cell. In this case, there could be no need for the detecting means to check whether the currently required word is held in the buffer means, other than (in some embodiments) to check whether the sequential access has overrun the end of a cache line held in the output buffer means.

Preferably the reading means comprises means for detecting whether the address of a current required memory cell is the last address in the group of memory cells containing the required memory cell.

The data memory is preferably a cache memory.

The invention is particularly usefully employed in data processing apparatus comprising a central processing unit; and a data memory as defined above.

Preferably, the central processing unit is operable to indicate that a current required memory cell has an adjacent address to a preceding required memory cell only when the address of the preceding required memory cell was not detected to have the last address in a group of memory cells. The central processing unit could either make this detection itself or rely on the detection by the reading means referred to above. In either case, the fact that the next access is made non-sequential could be used to trigger the reading means automatically to read a new cache line into the output buffer means.

Viewed from a second aspect this invention provides a method of operation of a data memory having an addressable array of memory cells which can be accessed as predetermined groups of memory cells, the method comprising the steps of:

storing the contents of at least the most recently read group of memory cells and another previously read group of memory cells in an output buffer means; and in response to an indication of whether the contents of the group of memory cells containing the required memory cell are stored in the output buffer means, reading the contents of the group of memory cells containing the required memory cell into the output buffer means;

the contents of at least the required memory cell being supplied as an output from the output buffer means.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
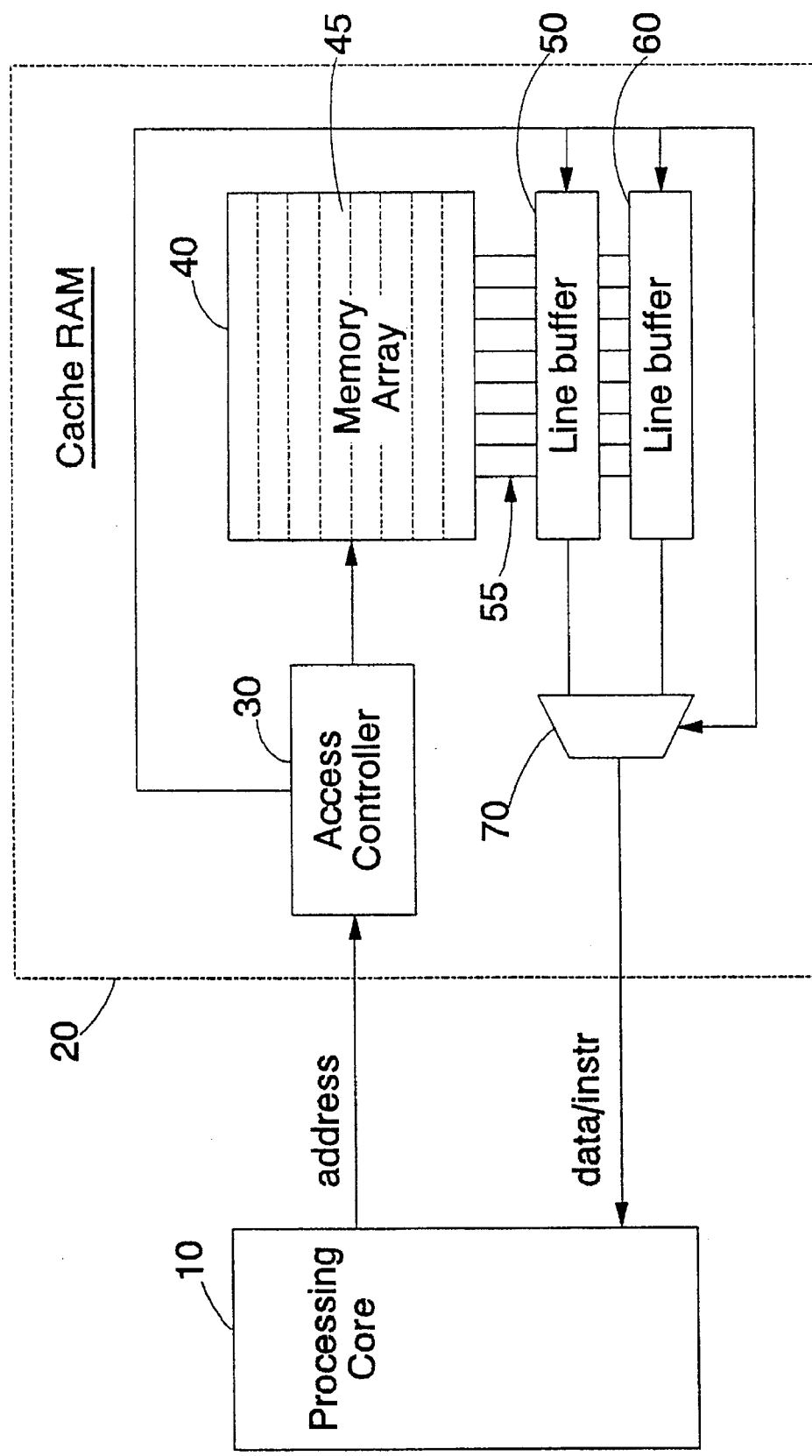
FIG. 1 is a schematic diagram of a data processing apparatus comprising a processing core and a cache random access memory (RAM)

FIG. 1 is a schematic diagram of a data processing apparatus comprising a processing core 10 connected to a cache random access memory (RAM) 20. The cache RAM 20 comprises an access controller 30, a memory array 40 comprising an array of transistor memory cells, two line buffers 50, 60 and a multiplexer 70.

The processing core 10 and the cache RAM 20 may be fabricated as respective parts of a common integrated circuit.

The memory array 40 comprises a number of cache lines 45 each formed of 256 memory cells. A cache line thus stores eight data words, each comprising 32 bits (4 bytes) of data.

Figure 2:
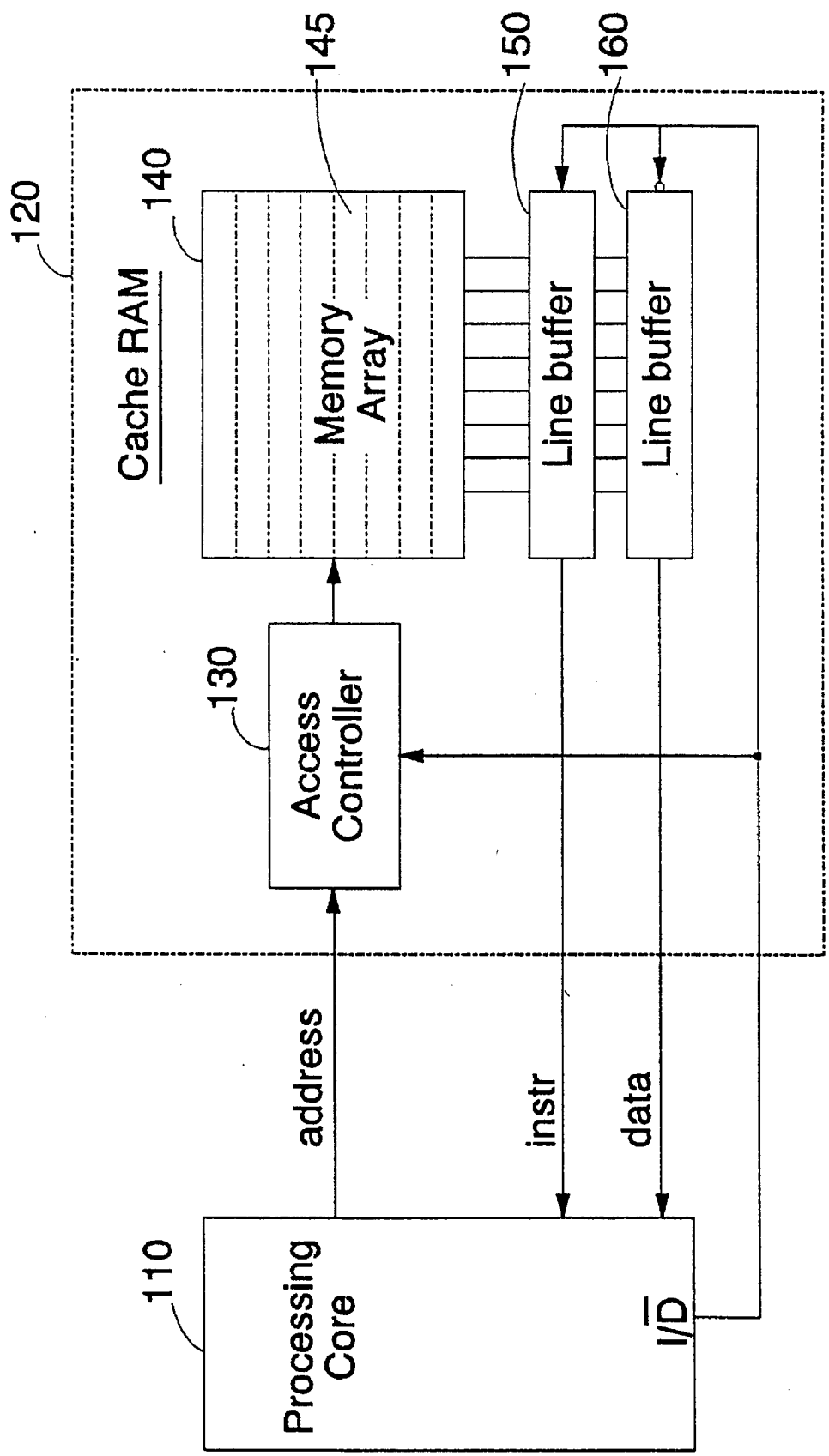
FIG. 2 is a schematic diagram of a second embodiment of a data processing apparatus comprising a processing core and a cache RAM.
Figure 3:
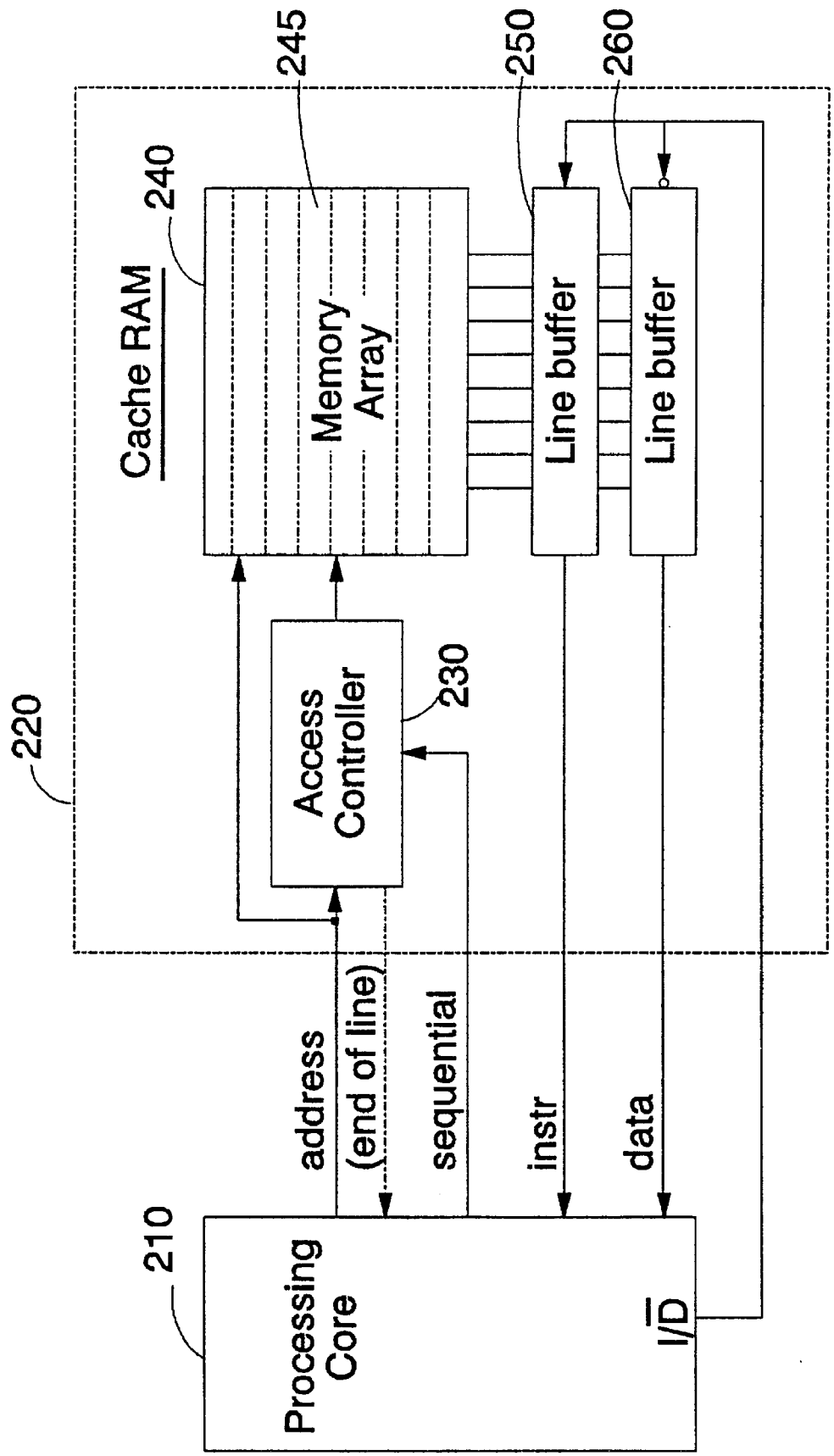
FIG. 3 is a schematic diagram of a third embodiment of a data processing apparatus comprising a processing core and a cache RAM.
Figure 4:
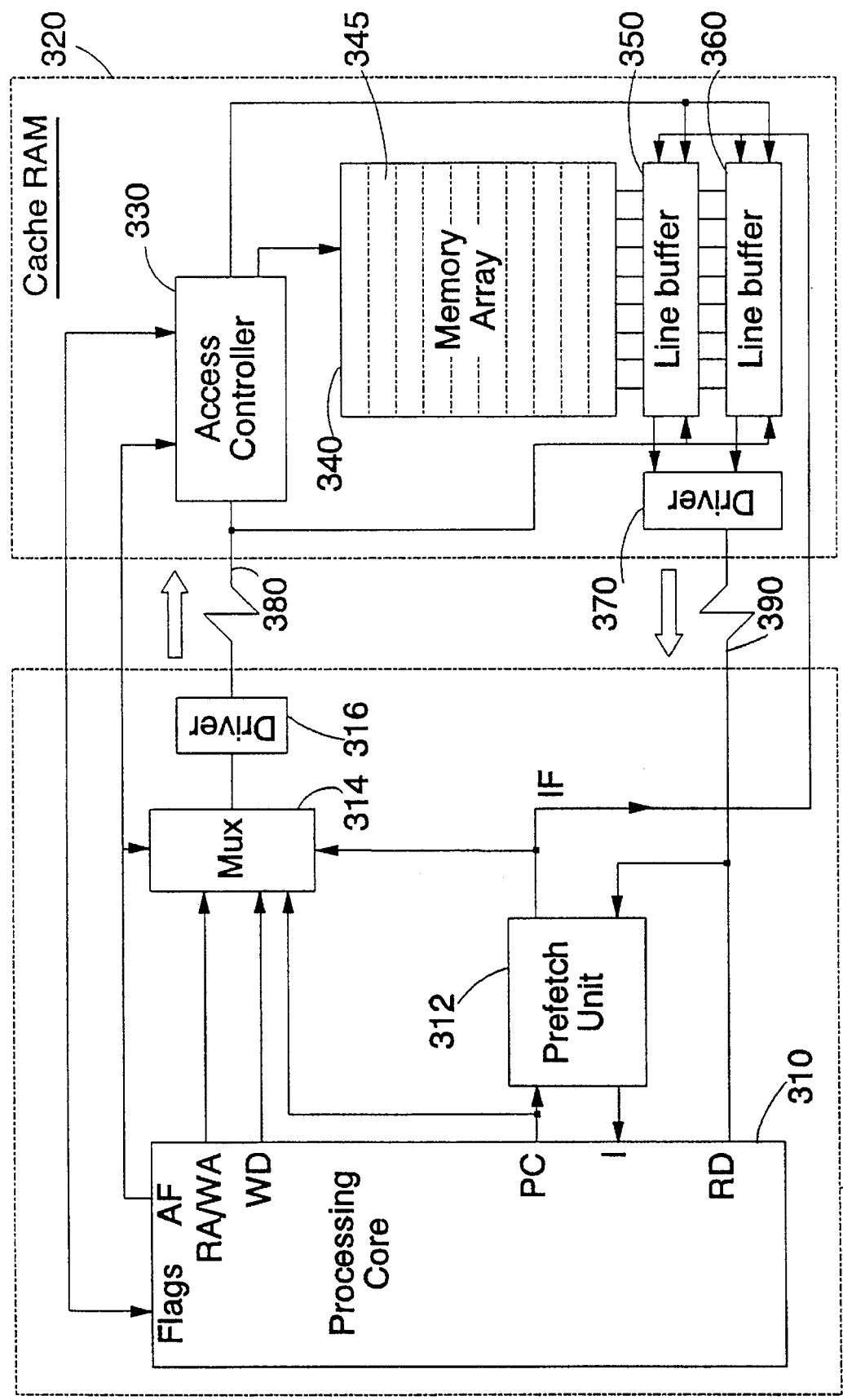
FIG. 4 is a schematic diagram of a fourth embodiment of a data processing apparatus comprising a processing core and a cache RAM.

In this Figure, and in FIGS. 2 to 4, the mechanism for reading data from the cache RAM is primarily illustrated; the mechanism for writing data to the cache RAM via the bit lines is otherwise conventional.

Under the control of the access controller 30 (to be described in greater detail below), one of the cache lines 45 can be selected for access and the data which are held in that cache line output (via conventional sense amplifiers) onto bit lines 55. The bit lines 55 are supplied in parallel to the line buffer 50 and the line buffer 60.

The cache RAM 20 is used to store both processor instructions and data to be processed. Generally, the processing core 10 will require access to one or more instruction words stored in one part of the cache RAM 20, followed by access to various data words stored in a different part of the cache RAM 20. After the data words have been accessed, the processing core 10 may well return to access a further instruction word stored adjacent to the previously accessed instruction words.

Accordingly, in normal operation the processing core 10 may well require alternate accesses to two distinct sections of the memory array 40, namely a section storing data words and a section storing instruction words. If a whole cache line had to be accessed each time the processing core 10 required access to a new part of the cache RAM 20 (as in the previously proposed cache memories described earlier), this would mean that whole cache lines 45 would have to be read repeatedly for alternate instruction-data-instruction accesses. This would increase the average power consumption (and possibly also the average access time) of the cache RAM 20.

In order to alleviate this problem, the present embodiment employs two line buffers 50, 60 operating under the control of the access controller 30. This arrangement will now be described in greater detail.

In the present embodiment, when a cache line 45 is accessed, the contents of that cache line are stored in one of the line buffers 50, 60. That buffer is designated the "current" buffer, under the control of the access controller 30. The contents of the current line buffer are then routed to the input of the processing core 10 via the multiplexer 70 (again, under the control of the access controller 30). The next cache line 45 which is read from the memory array 40 will be stored in the other one of the line buffers 50, 60, which buffer will then become the new current buffer. This means that the contents of the previously read cache line are not discarded but are instead stored in the non-current line buffer.

The access controller 30 retains a record of the particular cache lines 45 stored in each of the line buffers 50, 60, together with an indication of which of the line buffers is the current line buffer. Each time the processing core 10 requires access to a word stored in the cache RAM 20, the processing core 10 transmits an address to the access controller 30. The access controller 30 then detects whether the cache line 45 holding that word has already been read and is still currently stored in one of the line buffers 50, 60. If the required cache line 45 is stored in one of the line buffers 50, 60, that buffer then becomes the current line buffer, the multiplexer 70 selects the output of that line buffer, and the required word is supplied to the processing core 10 without the need to access the memory array again. If, however, the access controller 30 detects that the required word is not stored in either of the line buffers 50, 60, the access controller 30 controls the memory array 40 so that the required cache line 45 is read from the memory array 40. Data stored in that cache line 45 are output on the bit lines 55 and, under the control of the access controller 30, are stored in the non-current line buffer (which then becomes the current line buffer for output).

In the embodiment illustrated in FIG. 1, each of the line buffers 50, 60 may store either instruction words or data words. In practice, one of the line buffers 50, 60 will tend to store instruction words, and the other will tend to store data words, simply because of the generally alternate access required between these two types of words.

FIG. 2 illustrates a second embodiment in which there is a dedicated line buffer for storing instruction words and a second dedicated line buffer for storing data words.

In FIG. 2, a processing core 110 communicates with a cache RAM 120 comprising an access controller 130, a memory array 140 formed of a number of cache line 145 and two line buffers 150, 160.

The processing core 110 provides an address of a required data or instruction word, which is processed by the access controller 130, along with an "instruction-not-data" (I/D) signal line. The instruction-not-data signal line is supplied to the line buffers 150, 160 in complementary respective forms, so that one of the line buffers (in fact, the line buffer 150) is enabled when the processing core is reading an instruction from the cache RAM 120 and the other line buffer (the line buffer 160) is enabled when the processing core 110 is reading a data word from the cache RAM 120.

The access controller 130 maintains a record of the addresses of the cache line stored in each of the line buffers 150, 160, so that if the required data or instruction word for a current access is already stored in the appropriate line buffer 150, 160, that word is not accessed again but is simply read from the appropriate line buffer.

FIG. 3 is a schematic diagram of a third embodiment in which a processing core 210 communicates with a cache RAM 220 comprising an access controller 230, a memory array 240 having a cache lines 245, and line buffers 250, 260.

Again, the line buffers 250, 260 are dedicated to either instruction words or data words. Depending on the nature of the currently required word, the line buffer to be used will be referred to as the "appropriate" line buffer.

The operation of the access controller 230 is simplified in comparison to the access controller 130 of FIG. 2, by the use of a "sequential" flag from the processing core 210. The sequential flag is supplied to the access controller 230 and indicates that the current cache access required by the processing core 210 is sequential with respect to the immediately preceding cache access. An example of a sequential access is one in which the processing core 210 accesses a first instruction and, having processed or pipelined that instruction, accesses the immediately following instruction stored at an adjacent memory address in the cache RAM 220.

The apparatus of FIG. 3 may be operated in a number of different modes of operation. These will now be described in turn. The different modes may be reflected in different hardware or operating software used for the processing core and/or the access controller. In general, these differences are not apparent from the schematic nature of FIG. 3, but will be made clear from the following description.

First Mode of Operation

When a cache access is sequential, it will generally require access to the same cache line as the preceding cache access. However, as described above, that cache line will have been stored in either the line buffer 250 (for instructions) or in the line buffer 260 (for data words). Accordingly, the required word can be read from the appropriate line buffer 250, 260, selected by the instruction-not-data control flag from the processing core 210.

However, it is necessary to detect whether the currently required sequentially accessed word has in fact overrun the end of the cache line which is currently held in the appropriate line buffer. If so, the contents of that line buffer must be refreshed by reading the next cache line into the buffer.

The main roles of the access controller 230 in this mode of operation are therefore:

| Sequential Accesses (sequential flag is set) | Non-Sequential Accesses (sequential flag is not set) |
|---|---|
| The access controller 230 detects whether the required word is at the beginning of another cache line, rather than part of the cache line stored in the appropriate line buffer 250, 260. If so, the line containing that word is read into the appropriate line buffer. In either case, the required word is then output from the appropriate line buffer. | The access controller 230 detects whether the currently required word is stored in the appropriate line buffer 250, 260. If not, the line containing that address is read into the appropriate line buffer and the word is output from that line buffer. |

The detection of whether the currently required word has overrun the end of the currently buffered cache line can be made by detecting whether the lowest order bits of the required address correspond to the beginning of a cache line.

Second Mode of Operation

As an alternative, the access controller behaves as in the first mode of operation for sequential accesses, but always reads a new cache line into the appropriate line buffer for non-sequential accesses. This means that the only address comparison which the access controller has to do is to check whether the currently required word has overrun the end of a buffered cache line. These operations are summarised as follows:

| Sequential Accesses (sequential flag is set) | Non-Sequential Accesses (sequential flag is not set) |
| --- | --- |
| The access controller 230 detects whether the required word is at the beginning of another cache line, rather than part of the cache line stored in the appropriate line buffer 250, 260. If so, the line containing that word is read into the appropriate line buffer. In either case, the required word is then output from the appropriate line buffer. | The access controller 230 always reads the cache line containing the required word into the appropriate line buffer. The word is then output from that line buffer. |

Third mode of Operation

In a third mode of operation, the access controller detects whether a currently required word is at the end of the currently buffered cache line. If this is the case, the access controller sets an "end-of-line" flag which is sent to the processing core 210. When the end-of-line flag is set, the next cache access by the processing core is always forced to be a non-sequential access. The access controller responds by always reading a complete cache line into the appropriate line buffer when a non-sequential access is made by the processing core. These operations may be summarised as follows:

| Sequential Accesses (sequential flag is set) | Non-Sequential Accesses (sequential flag is not set) |
| --- | --- |
| The access controller 230 detects whether the required word is at the end of the currently buffered cache line and, if so, sets the end-of-line flag. The required word is output from the appropriate line buffer. | The access controller 230 always reads the cache line containing the required word into the appropriate line buffer. The word is then output from that line buffer. |

In this mode of operation, the processing core and the cache RAM cooperate to reduce the processing requirements of the access controller. There is no longer any need for the access controller to compare an incoming (required) address with a stored address; all that the access controller has to do is to flag when the last (in this case, the eighth) word is being read from one of the line buffers. The processing core then automatically makes the next cache access a non-sequential access (by not setting the sequential flag). The access controller interprets a non-sequential access as always requiring a cache line to be read into the appropriate line buffer 250, 260.

Fourth Mode of Operation

In a further mode of operation, the processing core itself retains a record of the number of words read from each cache line, or of the position of a current required word within a cache line. The processing core then automatically makes the first access of each cache line a non-sequential access, without requiring an end-of-line flag from the access controller. In this case, the operation of the access controller is simplified further, as follows:

| Sequential Accesses (sequential flag is set) | Non-Sequential Accesses (sequential flag is not set) |
| --- | --- |
| The required word is output from the appropriate line buffer 250, 260. | The access controller 230 always reads the cache line containing the required word into the appropriate line buffer. The required word is then output from that line buffer. |

Fifth and Sixth Modes of Operation

In further possible modes of operation, the access controller could behave as in the third or fourth modes for sequential accesses, but could do an address comparison (as in the first mode) for non-sequential accesses.

Finally, FIG. 4 is a schematic diagram of a fourth embodiment in which a central processing unit (CPU) 300 comprising a processing core 310, a prefetch unit 312, a multiplexer 314 and a bus driver 316 communicates with a cache RAM 320 comprising an access controller 330, a memory 340 having a cache lines 345, line buffers 350, 360 and a bus driver 370.

The multiplexer 314 supplies information to be transmitted to the cache RAM 320 (via the driver 316 and a unidirectional bus 380), selected from the following:

a read address or write address denoting the address of a required word in the cache RAM (RA/WA);

data to be written to the cache RAM (WD); and the program counter (PC), denoting the address of an instruction word held in the cache RAM.

The multiplexer 314 selects one of the above items to be transmitted via the unidirectional bus 380 under the control of an address flag (AF) and an instruction flag (IF). The address flag is generated by the processing core 310 and indicates that the core requires non-sequential read or write access to the cache RAM 320 and is placing an address on the unidirectional bus 380, and the instruction flag is generated by the prefetch unit 312 indicating that the prefetch unit requires access to an instruction word in the cache RAM 320. The items transmitted on the unidirectional bus 380 are supplied, along with the address flag and other flags (including a read flag and a write flag indicating data word read and write operations respectively) to the access controller 330. The access controller 330 and processing core 310 operate in a similar manner to any of the access controllers described above with reference to FIG. 3, using the address flag as the indication of sequential or non-sequential accesses and the instruction, read and write flags in place of the instruction-not-data flag described above. If appropriate for the particular one of the various modes of operation, the access controller supplies an end-of-line flag back to the processing core.

Under the control of the access controller 330, the required data or instruction word is either read from the memory array 340 or is output directly from an appropriate one of the line buffers 350, 360 to the bus driver 370. The data or instruction word is then transmitted via a second unidirectional bus 390 to the CPU 300. At the CPU 300, the item transmitted on the unidirectional bus 390 is routed either to the prefetch unit 312 (if it is an instruction) or to a read data (RD) input of the processing core 310 (if it is a data word).

An advantage of using unidirectional buses as shown in FIG. 4 is that it is not necessary to cease bus transmission in one direction (shutting down the respective bus driver) and then to re-start transmission in the other direction (initialising a different bus driver) with the associated power drain and delay.

In all of the above embodiments, the line buffers (50, 60; 150, 160; 250, 260; 350, 360) may be static latches, dynamic latches (such as capacitors or, in one of the two buffers, the capacitance of the bit lines), or other devices capable of temporarily holding the values on the bit lines. Three or more line buffers could of course be used; this arrangement could be appropriate for cache memories storing more than the two categories of words (instruction words and data words) described in connection with FIGS. 1 to 4. In this case, the contents of the line buffers could be overwritten by data of the same category or on a "least recently used" basis.

In a further alternative embodiment, the techniques described above could be applied to a cache memory formed of an array of blocks or segments, each storing, for example, 1 kilobyte of data. In this case, at least one line buffer is provided for each segment, for storing the previously read data output by that segment. The segments may be arranged in, for example, a 4×4 array, with each row of segments forming a 4-way associative cache. Direct addressing is used to select the correct row, and then the correct cache line within that row of segments. By splitting the cache into segments in this way, the capacitance of the bit lines can be reduced, leading to higher speed and lower power consumption operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the score and spirit of the invention as defined by the appended claims.

I claim:

1. A data memory operable to store at least two categories of data, said data memory comprising:
   an addressable array of memory cells which can be accessed as predetermined groups of memory cells;
   output buffer means for storing the contents of at least a most recently read group of memory cells and another previously read group of memory cells, said output buffer means comprising at least two output latches, each output latch being operable to store the contents of one group of memory cells; and
   reading means, responsive to an indication that said contents of said group of memory cells containing a required memory cell are not stored in said output buffer means, for reading said contents of said group of memory cells containing said required memory cell to said output buffer means, in which
   said contents of at least said required memory cell are supplied as an output from said output buffer means and
   data from each data category stored in said data memory are stored in a respective one of said output latches.

2. A data memory according to claim 1, in which at least one of said output latches is an active latch.

3. A data memory according to claim 1, in which at least one of said output latches is a capacitive latch.

4. A data memory according to claim 3, in which said capacitive latch or one of said capacitive latches is formed substantially by the capacitance of bit lines connected to said array of memory cells.

5. A data memory according to claim 1, in which said reading means is operable to read said contents of the group of memory cells containing said required memory cell into said output latch which has been least recently written to.

6. A data memory according to claim 1, in which the data memory stores two categories of data, namely:
   instruction words; and
   non-instruction words.

7. A data memory according to claim 1, comprising:
   means for storing address data indicative of an address of said groups of memory cells stored in said output buffer means; and
   detecting means, responsive to said address of a required memory cell and said stored address data, for detecting whether said contents of said group of memory cells containing said required memory cell is stored in said output buffer means;
   said detecting means generating and supplying to said reading means said indication of whether the contents of said group of memory cells containing said required memory cell are stored in said output buffer means.

8. A data memory according to claim 1, in which said reading means is responsive to an indication from a device accessing said data memory of whether a current required memory cell has an adjacent address to a preceding required memory cell.

9. A data memory according to claim 8, in which said reading means comprises means for detecting whether the address of a current required memory cell is a last address in said group of memory cells containing said required memory cell.

10. Data processing apparatus comprising:
    a central processing unit; and
    a data memory according to claim 9.

11. Data processing apparatus according to claim 10, in which:
    said central processing unit is operable to indicate that a current required memory cell has an adjacent address to a preceding required memory cell only when said address of said preceding required memory cell was not detected to have said last address in a group of memory cells.

12. A data memory according to claim 1, said data memory being a cache memory.

13. Data processing apparatus comprising:
    a central processing unit; and
    a data memory according to claim 1.

14. An array of data memories according to claim 1.

15. A method of operation of a data memory operable to store at least two categories of data and having an addressable array of memory cells which can be accessed as predetermined groups of memory cells, and having output buffers including at least two output latches, each for storing the output of one group of memory cells, said method comprising the steps of:
    storing the contents of at least a most recently read group of memory cells and another previously read group of memory cells in the output buffers;
    in response to an indication that said contents of said group of memory cells containing a required memory cell are not stored in said output buffers, reading said contents of said group of memory cells containing said required memory cell to said output buffers;
    supplying said contents of at least said required memory cell as an output from said output buffers; and
    storing in the respective ones of the output latches data from each data category stored in the data memory.

* * * * *